United States Patent [19]

Boero

[11] Patent Number: 4,768,882

[45] Date of Patent: Sep. 6, 1988

[54] OPTICAL POSITION SENSING APPARATUS

[75] Inventor: Paolo Boero, Milan, Italy

[73] Assignee: Societa' Cavi Pirelli S.p.A., Milan, Italy

[21] Appl. No.: 918,833

[22] Filed: Oct. 14, 1986

[30] Foreign Application Priority Data

Oct. 16, 1985 [IT] Italy ............................ 22518 A/85

[51] Int. Cl.$^4$ ............................................ G01B 11/14
[52] U.S. Cl. ..................................... 356/375; 356/373
[58] Field of Search ............ 356/373, 375; 250/20 R, 250/237 R, 227, 229, 231 SE, 231 R; 235/456, 494

[56] References Cited

U.S. PATENT DOCUMENTS

| | | | |
|---|---|---|---|
| 4,439,672 | 3/1984 | Salaman | 235/494 X |
| 4,572,952 | 2/1986 | March | 356/375 X |
| 4,573,000 | 2/1986 | Nelle | 356/375 X |
| 4,606,642 | 8/1986 | Nelle | 356/375 X |

Primary Examiner—Eugene R. LaRoche
Assistant Examiner—David Mis
Attorney, Agent, or Firm—Brooks Haidt Haffner & Delahunty

[57] ABSTRACT

Apparatus for sensing the position of a body which is rectilinearly movable with respect to a fixed, reference body which apparatus comprises a pair of surfaces on the movable object each with areas with a low coefficient of reflection and with a high coefficient of reflection and a pair of lens systems for projecting light on and receiving reflected light from respective ones of such surfaces. Light is supplied to such lens systems by optical fibers which are coupled to light-to-electrical signal converters for providing electrical signals dependent upon the amount of reflected light received from the surfaces and hence, upon the relative positions of the bodies. The pair of surfaces may be on the end of a piston operable by the pneumatic springs of a vehicle. Also, computer systems for processing the electrical signals of the converters and for actuating controls for changing the position of the movable body.

13 Claims, 3 Drawing Sheets

OPTICAL POSITION SENSING APPARATUS

The present invention relates to an optical sensor for monitoring the relative positions of two mechanical elements and in particular, for providing signals representative of the position of one of the two elements with respect to the other, which latter is considered as a reference. Such signals can be used to maintain the first element in a pre-established positional relationship with respect to the second element.

Sensors have been long known for determining the displacement of a movable body with respect to a reference structure for various uses and which have different characteristics, depending on the physical phenomenon used to detect the movement. Thus, there are sensors which take advantage of hydraulic, resistive, magnetic, optical, etc., phenomena.

The optical sensors are at present being continuously improved due to the recent progress in optoelectronic techniques and components which permit using the best of the typical advantages of this kind of sensor, i.e. the high precision, the quick response, the lack of wearing out, and the general insensitiveness to electrical and/or magnetic fields, temperature, etc.

Generally, the known optical sensors have a rather complicated construction which affects the cost and the reliability of the sensor and prevents the sensor from being used in a number of applications wherein its structure is incompatible with the constraints of geometric or other elements in which the sensor is to be applied.

Moreover, the known sensors, in order to obtain a high sensitivity, require reflecting surfaces of complicated configuration, often at the limit of the attainable precision for industrial appliances, and a plurality of light elements.

One object of the present invention is to provide an optical position sensor which is compact and of simple construction, especially with respect to the optical part, so that it can be used without undesired interference in systems of limited dimensions.

Another object of the present invention is that of providing a sensor in which the movable element does not need a reflecting surface with severe precision requirements, but which, nevertheless, provides a high response sensitivity with only two lighting elements.

The sensing apparatus of the invention comprises an optical sensor for determining the position of a movable body in a rectilinear direction with respect to a reference body or structure, said apparatus being characterized by the fact of comprising in combination:

(1) a reflecting surface integral with, or secured to, said body which is defined by a first and a second strip, said strips being coplanar and parallel to each other and parallel to the said rectilinear direction and having areas with different reflection coefficients;

(2) first means on said reference structure for directing a first collimated light beam onto a portion of said first strip and receiving the reflected light beam;

(3) second means on said reference structure for directing a second collimated light beam onto a portion of said second strip and receiving the reflected light beam, the relative intensities of the two reflected light beams being representative of the position of the body along said rectilinear direction.

In general, the means for directing the light beams onto the portions of the strips and receiving the reflected light beams comprises at least one optical system for focussing the light beams. These optical systems can comprise lenses of different type, for instance, lenses of cylindrical shape, of spherical shape (the so-called ball lenses), etc. The width of the light beams can be limited or restricted, both when being transmitted and received, by suitably modifying the surfaces of the optical systems or of the lenses which face the reflecting surfaces. For example, it is possible to form windows of rectangular, circular or other shape on the surfaces of the lenses facing the reflecting surfaces by making the remaining lens surface opaque.

The source or sources which supply the light can be either of the continuous or discontinuous emission type, e.g., in the form of pulses of light, and the emitted "light", the term including an electromaghetic radiation outside the visible spectrum, can be monochromatic or with a more or less extended bandwidth.

According to a preferred embodiment, the optical system of the said first and second means comprises a lens coupled to the end of an optical fiber, the other end of which is coupled to a light source, and the two lenses having their axes coinciding with those of the associated optical fibers respectively and being mounted side-by-side on a support on the reference structure with their axes perpendicular to the said reflecting surface. Also, the surfaces of the lenses facing the reflecting surface are smaller than the reflecting surfaces. Preferably, the lenses are of cylindrical shape and the light source or sources are of the continuous emission type.

Other objects and advantages of the present invention will be apparent from the following detailed description of the presehtly preferred embodiments thereof, which description should be considered in conjunction with the accompanying drawings in which:

Figure 1:
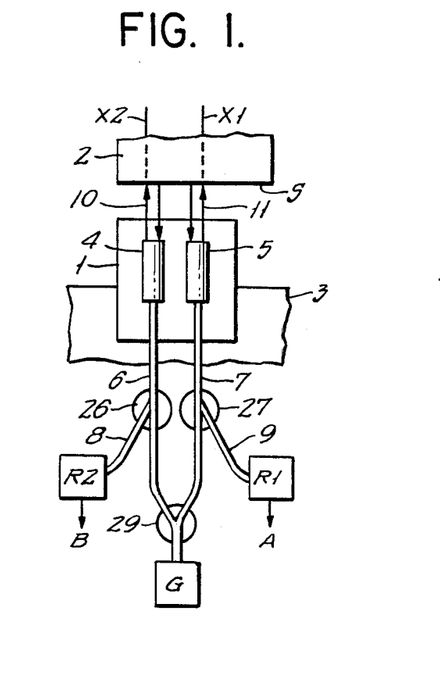
FIG. 1 is a diagrammatic plan view of the structure of the sensing apparatus according to the invention.
Figure 2:
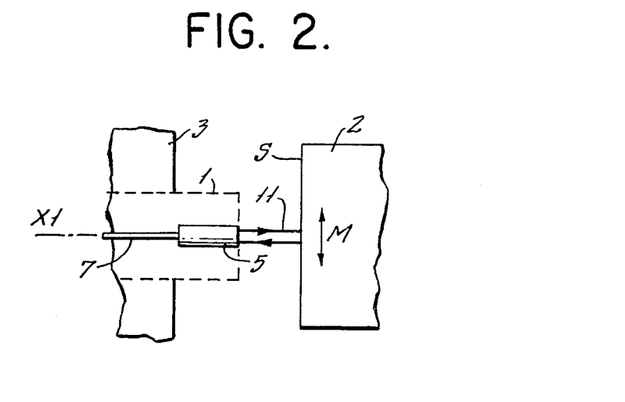
FIG. 2 is a similar view of a portion of the structure shown in FIG. 1.

FIGS. 1 and 2 diagrammatically show the structure and the use of the sensor according to the invention.

The sensor permits control of the position of a body 2 movable with respect to a reference body or structure 3 in rectilinear direction M shown in FIG. 2.

The sensing apparatus comprises a surface S movable with the body 2 and a support 1 on the structure 3, the structure 3 housing means to illuminate the surface S and receive the light beam reflected by two portions of said surface, such as, for example, those shown in FIG. 3 and described in detail later on.

In FIGS. 1 and 2, the means for illuminating the surface S and receiving the reflected light comprises two lenses 4 and 5, placed side-by-side, with their optical axes parallel, and two optical fibers 6 and 7 each coupled at one end to one of said lenses. At their other ends, the optical fibers 6 and 7 are coupled to a light source G which can be monochromatic due to a coupler 29. From the lenses 4 and 5, two collimated light beams 10 and 11 emerge and are reflected by the surface S in a manner depending upon the position assumed by the body 2. The reflected light beams are received by the lenses 4 and 5 and are retransmitted along the optical fibers 6 and 7 for further processing.

The lenses 4 and 5 can be, for example, of a conventional type, i.e. formed by straight glass cylinders having an index of refraction varying as a function of the distance from the axis of the cylinder according to a given curve, e.g. a parabola. A diverging monochromatic light beam that impinges onto one face of the cylinder, with its axis of symmetry coinciding with the cylinder axis, is transformed into a beam emerging from the other face which is collimated and parallel to the axis of the cylinder. In the same manner, a beam impinging onto one face of the lenses, which is collimated and parallel to the axis, is focused at the central point of the opposite face.

For simplicity, the movements of the body 2 are assumed to be perpendicular to the axes X1 and X2 of the lenses which, hereinafter are assumed to be cylindrical. However, the body 2 can perform a movement which is generally rectilinear even though there are components of movement along two perpendicular directions, i.e. in the direction M and in a direction parallel to the axes X1 and X2 of the lenses (cylindrical or of other type). As used herein, "in the direction" shall be used to mean that the movement has at least a component in the direction M. On the other hand, transverse movements, i.e. in a direction perpendicular to the two preceding ones, are not taken into account although small movements of this type can be tolerated.

The effect of the component parallel to the axes of the lenses is only that of drawing the body 2 near or moving the body 2 away with respect to the support 1, and hence, to the structure 3, without substantially varying the quantity of reflected light received from the cylindrical lenses, this quantity depending practically only on the reflection coefficient of the portion hit by the incident light beam. Therefore, said components parallel to the axes of the lenses will not be considered further in the following description.

The light beams reflected from the surface S again travel through the lenses 4 and 5 which focus them, and upon transiting the fibers 6 and 7, are extracted by two additional fibers 8 and 9 connected to the fibers 6 and 7 through couplers 26 and 27 and are sent to receiving apparatus R1 and R2 constituted by optical/electrical converters for supplying output signals proportional to the intensities of the reflected beams.

The output signals A and B produced by said receiving apparatus, are electrical signals and when considered together, are representative of the position of the body 2 with respect to the structure 3.

Depending on the type of reflecting surfaces and the type of optical/electrical converter, signals A and B can be either digital or analog. The former term is intended to mean that the electric signals, e.g. voltages, assume only two possible values, i.e. a "high" value to which a logic state 1 corresponds and a "low" value to which a logic value 0 corresponds. If the signals A and B are analog signals, the output signals A and B can assume any value between a maximum and a minimum. Preferably, the processing of the information in the control system will take place in digital form.

In particular, said signals A and B contain information on the drift or displacement of the body 2 with respect to a predetermined position range within which the body 2 is to be kept. As will be apparent hereinafter, when these signals are of analog type, the displacement can be determined with respect to an arbitrary number of value intervals. The signals A and B are used by processing and driving means causing, if so required, a compensating movement of the body 2.

Figure 3:
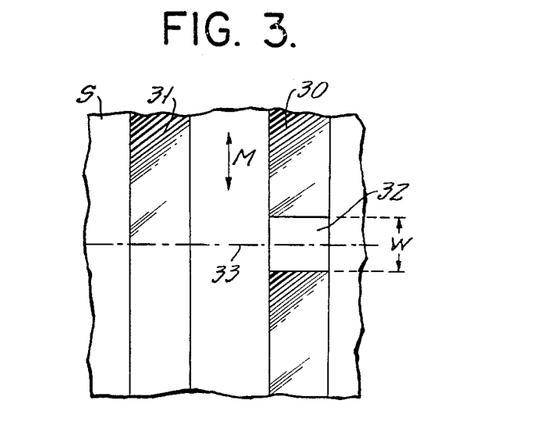
FIG. 3 is an enlarged end view of two reflecting strips used with the invention.

FIG. 3 shows one possible configuration of the surface S for producing digital signals. The surface S comprises two coplanar strips 30 and 31 parallel to each other and parallel to the rectilinear moving direction M and having areas with different reflection coefficients. In the illustrated embodiment, the surface S is flat and the two strips are obtained by modifying the surface appearance. However, this is not to be understood in a limiting sense because the surface S may be curving, and the strips may be separate strips of material secured to the body 2.

The surface areas of the strip having a low reflection coefficient will be called "non-reflecting" and are represented by intersecting diagonal lines in FIG. 3. However, the term "non-reflecting" does not exclude a small amount of light reflection, substantially less than the reflecting surfaces of the strip. The surface areas having a high reflection coefficient are called "reflecting", and in the strips 30 and 31, the reflecting areas are represented by areas without any marks thereon. Such drawing convention applies only to the areas of the strips 30 and 31 and not to the remaining part of the surface S which preferably is entirely non-reflecting to reduce undesired reflection effects. The length of the strips, which are shown in FIG. 3 as interrupted, depends on the lengths of the allowed movement of the body 2 with respect to the structure 1.

The strip 30 is non-reflecting for the whole length, except for a transverse band 32 of width W which depends on the position interval in which it is desired to maintain the body 2.

The axis 33 of the transverse band 32 divides the strip 31 into two parts, one of which is non-reflecting (the upper one in FIG. 3), and the other of which is reflecting. In principle, the remaining parts of the surface S have no relevance to the sensor operation and theoretically could be either non-reflecting or reflecting. In practice, when possible, the remaining parts of the surface S are non-reflecting to avoid undesired reflections, or as it will be explained later on, the areas of the surface S not forming the strips 30 and 31 can be reflecting and/or non-reflecting depending on manufacturing considerations, without prejudice for the correct operation of the sensor.

The lens 5 faces the strip 30 having the band 32, while the lens 4 faces the strip 31.

The unit formed by the lens 5, the optical fibers 7 and 9, the coupler 27 and the receiving apparatus R1 defines a "level" channel, while the corresponding elements 4, 6 and 8, 26 and R2 define a high/low channel as it will be explained more in detail hereinafter.

With reference to FIGS. 4 to 8, an embodiment of the sensor according to the invention will be illustrated, as it can be used to control the position of the air spring suspensions in a vehicle. In the FIGS., the same reference numerals are used for some components equal or corresponding to those illustrated in FIGS. 1 and 2.

Figure 4:
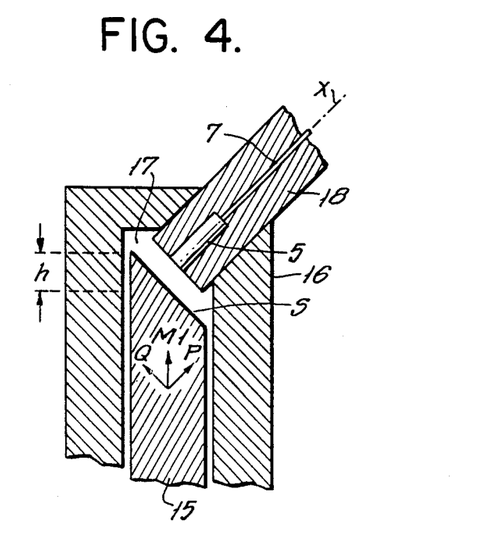
FIG. 4 is a fragmentary, cross-sectional view illustrating a sensor according to the invention used for controlling the position of a small piston within a cylinder.

For illustration purposes, it will be assumed that the relative motion of the two end plates of a pneumatic spring is reduced and transmitted through two metallic springs with different elastic constants to a small cylindrical piston 15 which moves in a reference structure 16 (corresponding to the structure 3) along a channel 17 into which the surface of a cylindrical support 18 (corresponding to the support 1) faces. The support 18 houses the two lenses 4 and 5, having their axes parallel to the axis of the support 18, and the two optical fibers 6 and 7 which constitute the emitting and receiving head for the light signals. The movement of the small piston is limited (by not shown means) to a maximum travel h which defines the movement limits. It will be assumed that it is desired to stabilize the position of the small piston in an interval much narrower than such travel and which is related to the width of the band W.

The axis X of the support 18 is inclined by a fixed angle, for example, by 45°, with respect to the axis of the small piston 15 and the surface S has a 45° chamfer so that the axes of the lenses 4 and 5 are perpendicular to the surface S which has an elliptical configuration. Therefore, a displacement in the direction M1 of the small piston 15 along its axis can be considered comprising two separate components, respectively, a component Q perpendicular to the axis X and a component P parallel to said axis which can be either approaching or moving away. Due to what has been previously stated, the effect of the compomnent P is not relevant to the sensor operation.

Figure 5:
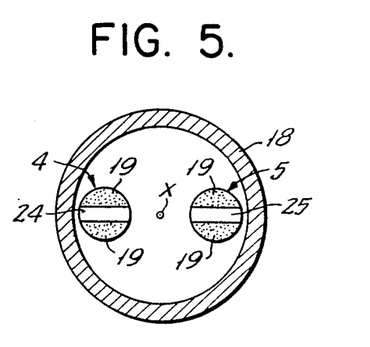
FIG. 5 is an end view of the sensor shown in FIG. 4.

FIG. 5 shows the front end of the support 18 with the lenses 4 and 5 placed side-by-side which, according to the invention, are rendered non-reflecting in correspondence to the circular sectors 19 so as to define two thin central strips 24, 25 that constitute transparent optical "slits".

This treatment permits limiting of the width of the light beam emitted along the direction parallel to the strips 30 and 31 so as to reduce the travel of the small piston required to pass from the "low" level to the "high" level and vice versa of the optical signal received in correspondence of the boundary line between the reflecting and non-reflecting areas.

The remaining structure of the sensor is the same as that illustrated in FIG. 1 with the lens 5 associated with the level channel (signal A) and the lens 6 associated with the high/low channel (signal B).

Figure 6:
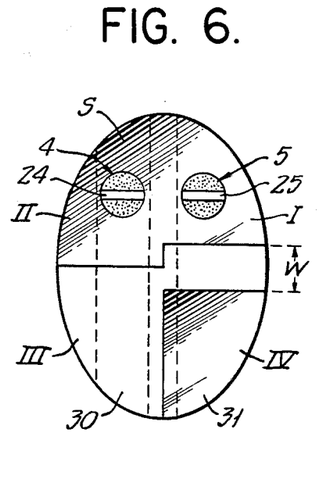
FIGS. 6, 7 and 8 illustrate the sensor operation in the case in which the signals representative of the movement are generated in digital form.
Figure 7:
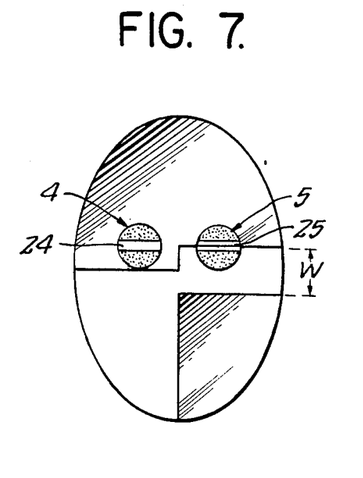
Figure 8:
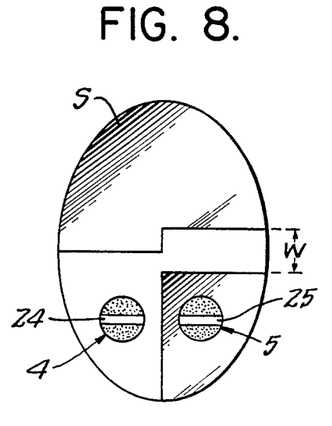

The sensor operation will now be illustrated with reference to FIGS. 6 to 8 showing an elliptical surface S of the small piston 15 which is suitable for supplying digital signals. In the FIGS., there are shown overlapped thereon, the lines of the facing surfaces of the lenses 4 and 5 and of the corresponding slits 24, 25 in three different situations.

As stated hereinbefore, in the practical construction of the surface S, particularly when the dimensions are small, it is not convenient to render non-reflecting some parts adjacent to the reflecting areas. Therefore, the ellipse that constitutes the surface S is more simply divided into four zones by the ellipse axes, said zones being indicated in the FIG. 6 with the numbers from I to IV. The zones II and III are respectively non-reflecting and reflecting, while both zones I and IV are non-reflecting with the exception of a band of width W which is astride of the shorter semi-axis of the ellipse. By way of example, the width W is of the order of one millimeter and this explains why it is preferable not to render non-reflecting all the surfaces outside the strips 30 and 31.

When the light field of the slit 25 of the lens 5 overlaps the reflecting band of width W, the reflected light enters the lens 5, travels along the optical fibers 7 and 9 and provides a high level output from the level channel, i.e. at the output of the receiving apparatus R1. This means that the small piston is within the range of the pre-established values and correspondingly the spring compression is within the established limits. If the sensor is incorporated into a position control system, no action is taken to modify the position of the spring and consequently of the small piston. When the level channel output is high, the value assumed by the high/low channel (output of the receiving apparatus R2) has no influence.

FIG. 7 illustrates a limit situation in which the light field of the slit 25 of the level channel only partially overlaps the reflecting band W. The receiving apparatus R1 and R2 can be adjusted in such a way that the logical level 1 is assigned to a pre-established value of the light intensity, for example, when the light intensity remains higher than 0.6 of the light intensity obtained in a full overlap. This allows for the desired tolerance in determining when the small piston is within the range of pre-established values. Since adjustment is of electrical type, the sensor sensitivity does not depend upon the construction of a precise reflecting surface.

In FIG. 7, the high/low channel supplies, in this case, a low level, i.e. a logical zero, which for the foregoing reasons does not affect the sensor operation.

In FIG. 6, the position of the small piston 15 is such that the light field of the two lenses 5 and 6 overlap non-reflecting zones of the strips 30 and 31, and therefore, the outputs A and B of both channels are at low logical level. A low output of the channel A indicates that the small piston is outside the range of the pre-established values and a low output logical of the channel B (high/low channel) indicates that the small piston 15, with reference to FIG. 4, has gone below the pre-established restricted interval within which it is desired to be maintained. In this case, this means that the spring has been elongated too much.

FIG. 8 shows an opposite situation in which the level channel has a low logical value and the high/low channel shows that the small piston 15 has risen over the desired position, that is, the spring has been compressed too much.

In other words, the signal from channel B (high/low) is significant only when the position of the small piston 15, and consequently of the spring, is outside the pre-established interval, whereas it has no influence when the piston is within said interval of pre-established values.

A sensor having the structure and a response such as illustrated above is of "digital" type since its outputs are limited to high or low logical values, corresponding respectively to a logical one (reflected light) and logical zero (no reflected light). Obviously, it is possible to use a reverse logic which need not be described since it can be derived in an obvious way from the foregoing.

Figure 9:
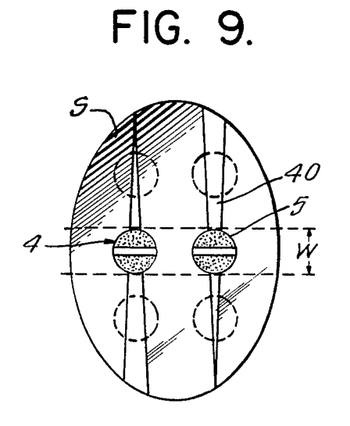
FIG. 9 illustrates the sensor operation in the case in which the signals representive of the displacement are generated in analog form.

FIG. 9 shows a surface S suitable for supplying analog signals. The two strips comprise two reflecting areas 40 and 41 of triangular shape or of decreasing width disposed in opposite directions, while the remaining surface S is non-reflecting. The same figure shows the traces of the optical lenses 4 and 5 corresponding to three different positions such as those shown in FIGS. 6 and 8. The lenses can be treated as in the previous embodiment to shape the light beam. The intensities of the reflected light beams vary in a continuous manner and correspondingly the signals supplied by the optical-/electrical converters are analog electric signals, the ratio of which indicates the position of the small piston 15 along its entire allowed travel. The configuraiton of FIG. 9 is, therefore, suitable for the adjustment of the level to any number of different ranges.

One possible method of operation is as set forth hereinafter.

When the small piston 15 is within the pre-established interval, such as the interval W shown in FIG. 9, the difference between the values of the two signals is lower than an assigned value independently of their sign or in other words, the modulus of said difference is smaller than a pre-established value.

When this difference exceeds the assigned value, the small piston 15 is outside the desired zone, and then, the sign of their difference becomes important, being representative of the displacement direction and consequently of the adjustment necessary to restore the piston 15 to the desired position. In the analog embodiment, there is not a sole channel providing information which may be sufficient to locate the position of the small piston 15.

The described optical sensor is particularly suitable for simultaneously and coordinatedly controlling the positions of a plurality of mechanical elements, for instance, the four suspensions of a vehicle in which a sensor is associated with each suspension and the corresponding signals are processed by a single centralized control unit.

In control systems comprising a plurality of correlated sensors, it is not necessary to use a light source and/or two separate receiving devices for each sensor, since some elements can be shared.

Figure 10:
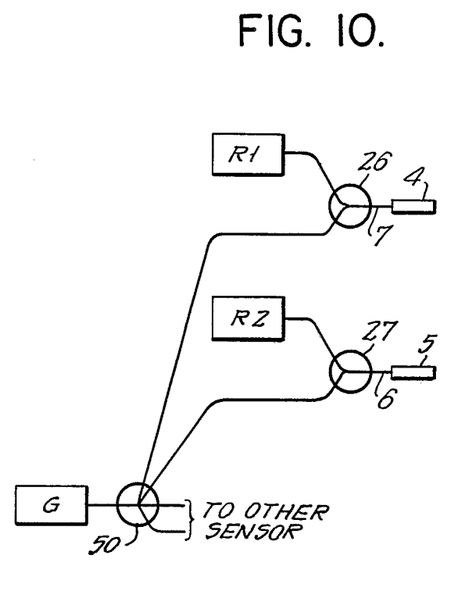
FIG. 10 shows diagrammatically the use of a plurality of sensors according to the invention for controlling the position of more than one element.

For example, FIG. 10 diagrammatically illustrates an arrangement in which a single light source G, of course of sufficient power, feeds a plurality of sensors, each sensor being provided with two receiving apparatuses R1 and R2, through a coupler 50, for instance, an eight branch coupler. For the sake of simplicity, only a channel with the lenses 4 and 5 and the necessary couplers 26 and 27 has been illustrated in FIG. 10, but it will be understood that the other sensor is similar to the one illustrated.

Figure 11:
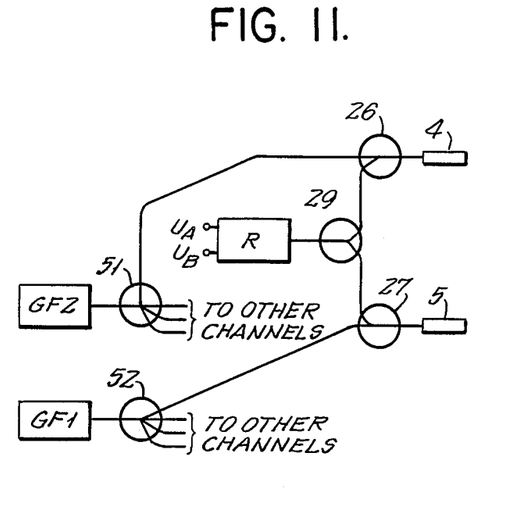
FIG. 11 shows diagrammatically an alternative embodiment of the arrangement of FIG. 10.

In the alternative, for the digital solution illustrated in FIG. 11, it is possible to use two light generators and more precisely a generator GF1 for all the level channels and a generator GF2 for all the high/low channels, modulated at two different frequencies and two couplers 51, 52. In this way, for each two channels, only one receiving apparatus R is sufficient, such apparatus R being able to separate the two modulated reflected beams and route the corresponding electric signals on two separate outputs UA and UB.

Also, FIG. 11 shows a single sensor comprising the lenses 4 and 5 with the couplers 26, 27, and a further coupler 29 to take both the reflected beams to the same receiving apparatus R. Using a suitable optical switch, it is possible to use only one light generator connected alternately to one of the two channels of each sensor.

Figures 12, 13:
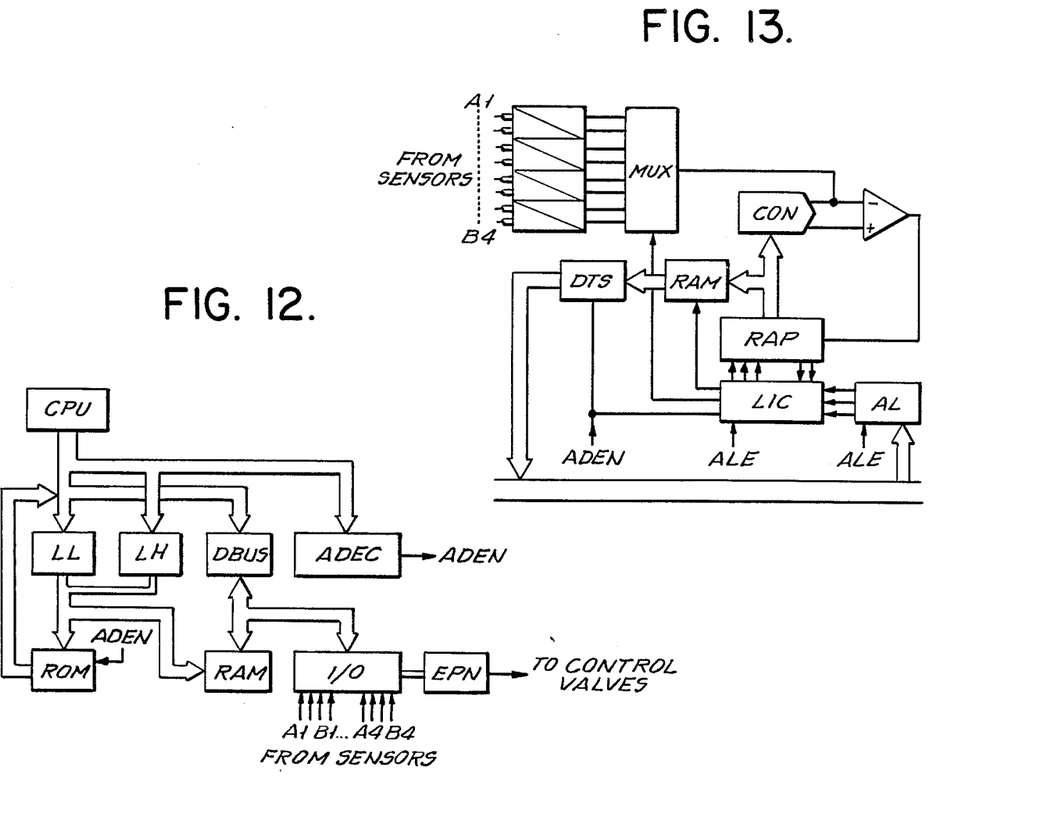
FIG. 12 is a block diagram of a digital control system using signals from the sensors shown in FIGS. 6 to 8.
FIG. 13 is a partial block diagram of another control system, using analog signals from the sensors shown in FIG. 9.

FIG. 12 illustrates an embodiment of a control system which can be connected to the digital sensor of the type shown in FIGS. 4 to 8 for controlling the four suspensions of a vehicle.

The eight outputs of the channel optical/electrical converters A1 . . . B4 are connected to the I/O port (input/output) of a microprocessor system comprising a central processing unit (CPU), a read/write memory RAM where the data received from the sensors are temporarily stored, a permanent ROM containing the control program and an interface EPN which supplies the drive signals for the solenoid valves which modify the position of the springs when required.

The updating of the content of the RAM is periodically carried out by an address decoder ADEC that enables the ROM memory. The system also comprises an interface DBUS and two latch circuits LL and LH for the addresses. The operation of the control system will be apparent to those skilled in the art.

FIG. 13 is a block diagram of a part of a control system that can be connected to four sensors of analog type, i.e. having a surface S of the type shown in FIG. 9. Also, in this case, the system is used for controlling the four suspensions of a vehicle.

The eight analog electric signals A1 . . . B4 received from the optical/electrical analog converters are fed as voltage levels to the inputs of a multiplexer MUX and sequentially converted into an eight bit binary word using a successive approximation technique in a converter CON.

When the conversion of a channel has been completed, the content of the successive approximation register RAP is loaded in the corresponding location of the RAM memory.

The updating of the content of the RAM memory takes place through the address latch circuit AL and an interface and control logic unit LIC.

A drive circuit DTS enables the transfer of the read data on the data channel for a comparison between the power level received from the sensors and, if necessary, to drive the solenoid valves.

Of course, there are other embodiments which will be apparent to those skilled in the art. For example, although not preferred, the illuminating means can be different from the means which receives the reflected beams. This can be obtained by means of two cylindrical lenses placed side-by-side and maintaining the reflection strips perpendicular to the axes of the lenses, or by arranging the two lenses spaced apart from each other, with the axes thereof forming preferably equal angles with the surface S. If the movable body is sufficiently large, the sensors may be mounted on the movable body and the reflecting-non-reflecting strips, such as the strips 30 and 31, may be mounted on the reference structure.

Although preferred embodiments of the present invention have been described and illustrated, it will be apparent to those skilled in the art that various modifications may be made without departing from the principles of the invention.

The embodiments of the invention in which an exlcusive property or privilege is claimed are defined as follows:

1. Optical position sensing appartus for indicating the position of a movable, first body which is movable in a rectilinear direction with respect to a reference, second body, fixed in position, said apparatus comprising:

light receiving first means on said movable, first body providing a pair of coplanar surfaces with areas spaced from each other transversely of said direction and extending in said direction and parallel to each other, portions of said areas having different light reflection coefficients;

second means mounted on said reference, second body for both directing a first light beam onto one of said pair of surfaces and for receiving light reflected from said one of said pair of surfaces; and third means mounted on said reference, second body for both directing a second light beam onto the other of said pair of surfaces and for receiving light reflected from said other of said pair of surfaces whereby the relative amounts of reflected light received by said second means and said third means varies with movement of said first body in said direction relative to said second body.

2. Optical position sensing apparatus as set forth in claim 1 wherein in said direction, one of said pair of surfaces has an area with a high reflection coefficient adjoining an area with a low reflection coefficient and the other of said pair of surfaces has an area with a high reflection coefficient intermediate a pair of areas with a low reflection coefficient, the last-mentioned said area with a high reflection coefficient being adjacent the meeting line where the high reflection coefficient area of said one of said pair of surfaces adjoins the low reflection coefficient area of said one of said pair of surfaces.

3. Optical position sensing apparatus as set forth in claim 1 wherein said second means comprises an optical lens for both focussing and directing a substantially cylindrical light beam onto said one of said pair of surfaces and receiving and focussing light reflected from said one of said pair of surfaces and said third means comprises an optical lens for both focussing and directing a substantially cylindrical light beam onto said other of said pair of surfaces and receiving and focussing light reflected from said other of said pair of surfaces.

4. Optical position sensing apparatus for indicating the position of a movable, first body which is movable in a rectilinear direction with respect to a reference, second body, fixed in position, said apparatus comprising:

light receiving first means on said movable, first body providing a pair of coplanar surfaces with areas spaced from each other transversely of said direction and extending in said direction and parallel to each other, portions of said areas having different light reflection coefficients;

second means mounted on said reference, second body for directing a first light beam onto one of said pair of surfaces and for receiving light reflected from said one of said pair of surfaces, said second mean comprising an optical lens for both directing light onto said surfaces and receiving light from said surfaces; and third means mounted on said reference, second body for directing a second light beam onto the other of said pair of surfaces and for receiving light reflected from said other of said pair of surfaces, said third means comprising an optical lens for both directing light onto and receiving light from said other of said pair of surfaces whereby the relative amounts of reflected light received by said second means and said third means varies with movement of said first body in said direction relative to said second body.

5. Optical position sensing apparatus as set forth in claim 4 wherein said lens of said second means is mounted adjacent, and is spaced transversely to said direction from, said lens of said third means, wherein each said lens has its light axis extennding transversely to said direction and further comprising a light source and a pair of optical fibers extending from said source to each said lens for transmitting light from said source to both of the lenses.

6. Optical position sensing apparatus as set forth in claim 4, further comprising a pair of optical couplers and a pair of light to electrical signal converters, one of said optical couplers being coupled coupled to one of said pair of optical fibers intermediate said source and the lens to which said one of said pair of optical fibers extends and to one of said converters for transmitting reflected light to said one of said optical couplers and the other of said optical couplers being similarly coupled to the other of said pair of optical fibers and to the other of said converters for transmitting reflected light to said other of said converters.

7. Optical position sensing apparatus as set forth in claim 5 wherein the output of said pair of light to electrical signal converters is an electrical signal in digital form.

8. Optical position sensing apparatus as set forth in claim 5 wherein each said lens has screening means for providing a light beam which is rectangular in cross-section.

9. Optical position sensing apparatus for indicating the position of a movable, first body which is movable in a rectilinear direction with respect to a reference, second body, fixed in position, said apparatus comprising:

light receiving first means on said movable, first body providing a pair of coplanar surfaces with areas spaced from each other transversely of said direction and extending in said direction and parallel to each other, portions of said areas having different light reflection coefficients, one of said pair of surfaces, in said direction, having an area with a high reflection coefficient and of a width which decreases in said direction and the other of said pair of surfaces having an area with a high reflection coefficient and of a width which decreases in a direction opposite to said direction;

second means mounted on said reference, second body for directing a first light beam onto one of said pair of surfaces and for receiving light reflected from said one of said pair of surfaces; and third means mounted on said reference, second body for directing a second light beam onto the other of said pair of surfaces and for receiving light reflected from said other of said pair of surfaces whereby the relative amounts of reflected light received by said second means and said third means varies with movement of said first body in said direction relative to said second body.

10. Optical position sensing apparatus as set forth in claim 9 further comprising a pair of light to electrical signal converters, wherein one of said converters is coupled to said second means and the other of said converters is coupled to said third means for providing electrical signals proportional to the amount of reflected light received, respectively, by said second means and said third means.

11. Optical position sensing apparatus for indicating the position of a movable, first body which is movable in a rectilinear direction with respect to a reference, second body, fixed in position, said apparatus comprising:

light receiving first means on said movable, first body providing a pair of coplanar surfaes with areas spaced from each other transversely of said direction and extending in said direction and parallel to each other, portions of said areas having different light reflection coefficients, said first body being an axial movable piston and said pair of surfaces being an end surface of said piston;

second means mounted on said reference, second body for directing a first light beam onto one of said pair of surfaces and for receiving light reflected from said one of said pair of surfaces; and third means mounted on said reference, second body for directing a second light beam onto the other of said pair of surfaces and for receiving light reflected from said other of said pair of surfaces whereby the relative amounts of reflected light received by said second means and said third means varies with movement of said first body in said direction relative to said second body.

12. Optical position sensing means as set forth in claim 11 wherein said piston is cylindrical and said end surface is elliptical.

13. Optical position sensing means as set forth in claim 12 wherein one of said pair of surfaces is at one side of the major axis of said end surface and comprises an area with a high reflection coefficient adjoining, and spaced in the direction of sadi major axis from, an area with a low coefficient of reflection and the other of said pair of surfaces being at the other side of said major axis and comprising a pair of areas with a low coefficient of reflection spaced from each other, in the direction of said major axis, by an area with a high coefficient of reflection.

* * * * *

UNITED STATES PATENT AND TRADEMARK OFFICE
CERTIFICATE OF CORRECTION

PATENT NO. : 4,768,882
DATED : September 6, 1988
INVENTOR(S) : Boero

It is certified that error appears in the above-identified patent and that said Letters Patent is hereby corrected as shown below:

In the first sheet, after the list of references under [56] and before the words "Primary Examiner", insert        4,150,299   4-1979    Kasiewicz et al   250 561

FOREIGN PATENT DOCUMENTS        2,121,252   12-1983   GB   Davies et al   G08C 9/06
       2,054,995    2-1981   GB   Stephens et al G08C 9/06
       2,054,135    2-1981   GB   Berti et al    G01B 11/14
       1,329,671    9-1973   GB   Stempler et al G09F 11/295
       0,956,347    4-1964   GB Col. 2, line 32, "presehtly" should read --presently--;
Col. 4, line 25, the period (.) after "modifying" should be deleted;
Col. 5, line 35, "compohent" should read --component--;
Col.10, line 13, delete "coupled" (second occurrence);
Col.12, line 12, "sadi" should read --said--.

Signed and Sealed this

Twenty-seventh Day of June, 1989

Attest:

DONALD J. QUIGG

Attesting Officer              Commissioner of Patents and Trademarks